3,364,215
NITROSO AND NITRO TRIAZINE
DERIVATIVES
Johannes T. Hackmann, Herne Bay, Kent, Herbert P. Rosinger, Tunstall, near Sittingbourne, Kent, and Derek A. Wood, Sittingbourne, Kent, England, assignors to Shell Oil Company, New York, N.Y., a corporation of Delaware
No Drawing. Filed Feb. 21, 1963, Ser. No. 260,315
Claims priority, application Great Britain, Nov. 1, 1962, 41,368/62
7 Claims. (Cl. 260—249.8)

This invention relates to novel 1,3,5-triazine derivatives and to a process for their preparation. These compounds are not only useful intermediates in chemical synthesis but also possess marked herbicidal properties. They also have useful pharmacological properties, especially analgesic and soporific properties. The invention therefore also relates to compositions comprising said compounds for use in agriculture for combatting weeds and for other uses. The invention also relates to the use of said compounds and compositions for combatting weeds and to the treatment of areas bearing or intended to bear crops with said compounds or compositions.

The triazine compounds of this invention may be represented by the formula

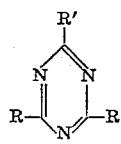

wherein each R represents the group $-N(H)_p(R^2)_q$ wherein $R^2$ represents an alkyl group containing one to three carbon atoms, that is, amino ($-NH_2$ or mono- or di-lower alkylamino, $p$ is 0 or 1 and $q$ is an integer 1 or 2 and such that $p+q=2$; $R^1$ represents a nitroso or nitro group, a group of general formula

wherein $R^3$ represents a hydrogen atom, an alkyl group of one to four carbon atoms, or an acetyl group, and $R^4$ represents a hydrogen atom or an acetyl group ($CH_3.CO-$).

In the pure state these compounds are crystalline solids. They dissolve in most organic solvents including tetrahydrofurfuryl alcohol, lower alkyl alcohols and lower hydrocarbons. They are all substantially insoluble in water. Compounds of the above formula wherein $R^1$ represents the group $-NHOH$ are readily oxidized to their nitroso and nitro derivatives and acetylated to their diacetyl derivatives.

The present invention provides a process for the preparation of compounds of the above general formula wherein $R^1$ represents the sub-group $-NHOH^5$ which comprises reacting under anhydrous conditions or substantially anhydrous conditions a compound of the formula

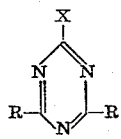

wherein X represents a middle halogen (chlorine or a bromine) atom, that is, halogen of atomic number from 17 to 35, with a compound of the general formula $NH_2OR^5$, $R^5$ representing a hydrogen atom or an alkyl group containing one to four carbon atoms and R having the meaning hereinbefore specified. The reaction may be carried out in the absence of a solvent but an inert organic solvent is advantageously employed. Ethanol or tetrahydrofurfuryl alcohol or mixtures thereof have been found particularly suitable. The reaction is carried out at a temperature in the range 50° to 150° C., preferably in the range 100° to 120° C. Higher or lower temperatures may however be used. The reaction is suitably effected at atmospheric pressure but higher or lower pressures may be employed if desired. In general, the reaction is substantially complete in 0.5 to 5 hours. The reaction mixture may then be worked up by any convenient procedure. Suitably the solvent is first removed by distillation, if necessary under reduced pressure. The residue is then dissolved in water and the desired product precipitated by adding an inorganic base, suitably an alkali metal carbonate or bicarbonate, preferably sodium bicarbonate. The inorganic base may be added in solid form or in aqueous solution. The product thus obtained is in general sufficiently pure for use but if desired it may be purified by recrystallization from an organic solvent. Ethanol is a suitable solvent for this purpose. The desired product is in general obtained in good yields.

Compounds of the invention having the above general formula wherein $R^3$ and $R^4$ each represent an acetyl group, can be prepared, according to an extension of the process of the invention, by reacting a product of said process having the above general formula wherein $R^1$ represents the group $-NHOH$ with an acetylating agent. Acetyl chloride may be used for this purpose especially when the symbols R represent tertiary amino groups. When R represents a secondary amino group, it is preferably to use acetic anhydride as the acetylating agent, suitably in presence of a small amount of sodium acetate or concentrated sulfuric acid as catalyst.

Compounds produced by the process of the invention and having the above general formula wherein $R^1$ represents the group $-NHOH$ can according to another extension of the process, be oxidized to the corresponding nitroso compound. Oxidizing agents which may be used for this purpose are potassium nitrosyl disulphonate, chromic acid, or preferably, potassium permanganate. The reaction is effected in an inert liquid reaction medium which may be aqueous or may be an inert organic liquid, preferably one which is a solvent for the initial hydroxylamino compound or the nitroso compound, or for both. A ketone may be used as a solvent, acetone being particularly suitable. The organic liquid used is preferably anhydrous or substantially anhydrous. Preferably, the triazine compound is dissolved or suspended in particulate form in the solvent, preferably acetone and an approximately equimolar quantity, preferably a slight excess, of finely powdered potassium permanganate gradually added as such, or as a solution or dispersion in the solvent, preferably acetone. In general, the reaction proceeds rapidly at temperatures in the range 15° to 25° C. when the hydroxylamino compound is soluble in the reaction medium but when it is insoluble somewhat higher temperatures, for example up to 50° C. are required in the later stages of the reaction. During the reaction manganese dioxide is of course formed. If the desired product is also insoluble, the manganese dioxide is removed from the washed filtered mixture by treating an aqueous suspension of the mixture with sulphur dioxide. All traces of manganese dioxide can be removed by this method, leaving the desired product as a yellow micro-crystalline powder. Any traces of the initial hydroxylamino compound can be removed by extracting the product with a suitable solvent, preferably with the warm or boiling solvent. Examples of solvents which may be used are acetone or an aliphatic alcohol containing 1 to 3 carbon atoms. Boiling ethanol is preferred as its use results in a very clean product. When the desired reaction product is soluble in the organic liquid reaction medium used, it may be isolated from the manganese dioxide by straight forward filtration. The filtrate containing the desired product is suitably evaporated to dryness preferably, under reduced pressure, and the residue purified by several recrystallizations from a lower hydrocarbon, preferably hexane. The desired compounds are produced in good yield.

Particular examples of the novel compounds produced in the hereinbefore described processes are the following:

2,4-bisethylamino-6-hydroxyamino-1,3,5-triazine
2,4-bisdiethylamino-6-hydroxyamino-1,3,5-triazine
2,4-bisisopropylamino-6-hydroxyamino-1,3,5-triazine
2,4-bisethylamino-6-ethoxyamino-1,3,5-triazine
2,4-bisethylamino-6-t-butoxyamino-1,3,5-triazine
2,N-acetoxyacetamido-4,6-bisdiethylamino-1,3,5-triazine
2,4-bisethylamino-6-nitroso-1,3,5-triazine
2,4-bisdiethylamino-6-nitroso-1,3,5-triazine.

The following examples illustrate the preparation of the novel compounds of the invention.

*Example I.—Preparation of 2,4-bisethylamino-6-hydroxyamino-1,3,5-triazine*

Hydroxylamine (3.3 grams) in absolute ethyl alcohol was added to 2,4-bisethylamino-6-chloro-1,3,5-triazine (10 grams) dissolved in tetrahydrofurfuryl alcohol at 100° C. and the mixture refluxed for one hour. The solvents were then distilled off eventually under reduced pressure. The residue was dissolved in distilled water, filtered and neutralized with aqueous sodium bicarbonate solution. The crude 2,4-bisethylamino-6-hydroxyamino-1,3,5-triazine was recrystallized from ethanol to give a 70% yield. The product had M.P. 197° to 198° C.

*Analysis.*—Found: C, 42.5; H, 7.1; N, 42.4%.

$C_7H_{14}N_6O$ requires: C, 42.4; H, 7.1; N, 42.4%.

*Example II.—Preparation of 2,4-bisdiethylamino-6-hydroxyamino-1,3,5-triazine*

Hydroxylamine (5 grams) in absolute ethyl alcohol was added to 2,4-bisdiethylamino-6-chloro-1,3,5-triazine (12.8 grams) dissolved in tetrahydrofurfuryl alcohol at 100° C. and the mixture refluxed for one hour. The solvents were removed and the product worked up by the same method as employed in Example I. The product was recrystallized from ethanol and it then had M.P. 107° to 108° C. Yield 70%.

*Analysis.*—Found: C, 52.2; H, 8.8; N, 33.2%.

$C_{11}H_{22}N_6O$ requires: C, 52.0; H, 8.7; N, 33.1%.

2,4-bisisopropyl-6-hydroxyamino-1,3,5-triazine was also prepared by the same method. The product was recrystallized from a mixture of hexane, benzene and aqueous alcohol and it then had M.P. 148° to 150° C. Yield 70%.

*Analysis.*—Found: C, 48.5; H, 8.3; N, 36.9%.

$C_9H_{18}N_6O$ requires: C, 48.0; H, 8.0; N, 37.2%.

*Example III.—Preparation of 2,4-bisethylamino-6-ethoxyamino-1,3,5-triazine*

2,4-bisethylamino-6-chloro-1,3,5-triazine (5.03 grams) was added to O-ethyl hydroxylamine (3.05 grams) and the mixture dissolved in tetrahydrofurfuryl alcohol. The solution was heated on a steam bath for two hours and then the bulk of the solvent distilled off under reduced pressure. The concentrate was added to water and the product precipitated by neutralization with aqueous sodium bicarbonate solution. The product was recrystallized from an ether/hexane mixture and it then had M.P. 90° C. Yield 60%.

*Analysis.*—Found: C, 48.1; H, 7.7; N, 37.1%.

$C_9H_{18}N_6O$ requires: C, 47.7; H, 7.9; N, 37.2%.

2,4 - bisethylamino - 6-t-butoxyamino-1,3,5-triazine was also prepared by this method. The product M.P. 146° to 147.5° C. was produced in 79% yield.

*Analysis.*—Found: C, 52.3; H, 9.0; N, 32.8%.

$C_{11}H_{22}N_6O$ requires: C, 52.0; H, 8.7; N, 33.1%.

*Example IV.—Preparation of 2-N-acetoxyacetamido-4,6-bisdiethylamino-1,3,5-triazine*

To the 2,4-bisdithylamino-6-hydroxyamino-1,3,5-triazine prepared in Example II was added with stirring excess acetic anhydride containing a few drops of concentrated sulfuric acid. The diacetyl derivative M.P. 66° to 67° C. was produced in nearly quantitative yield.

*Analysis.*—Found: C, 53.3; H, 8.0; N, 25.0%.

$C_{15}H_{26}N_6O_3$ requires: C, 53.3; H, 7.7; N, 24.7%.

*Example V.—Preparation of 2,4-bisethylamino-6-nitroso-1,3,5-triazine*

2,4 - bisethylamino - 6 - hydroxyamino-1,3,5-triazine (4 grams) as prepared in Example I was suspended in dry acetone (100 mililiters) and treated with finely powdered potassium permanganate (4.2 grams). The reaction proceeded rapidly at room temperature but gradually slowed down after half the permanganate had been added. The mixture was then warmed to about 40° C. to complete the reaction. The resultant mixture of the desired product and manganese dioxide was filtered off, washed with distilled water until neutral and treated in aqueous suspension with sulfur dioxide water until all the manganese dioxide had dissolved. The residual yellow microcrystalline product was extracted with boiling ethanol to remove any contaminating starting material and then had M.P. 170° C. It was too insoluble in the usual organic solvents to be recrystallized. Yield 70%.

*Analysis.*—Found: C, 43.4; H, 6.4; N, 42.0%.

$C_7H_{12}N_6O$ requires: C, 43.0; H, 6.2; N, 42.8%.

A similar results was obtained in another preparation in which the postassium permanganate was added as an acetone solution.

*Example VI.—Preparation of 2,4-bisdiethylamino-6-nitroso-1,3,5-triazine*

2,4 - bisdiethylamino - 6-hydroxyamino-1,3,5-triazine (5.08 grams) as prepared in Example II was dissolved in dry acetone (50 mililiters) and treated with powdered potassium permanganate (2.1 grams). The reaction went to completion at room temperature. The manganese dioxide was filtered off and the resulting pale yellow filtrate containing the product evaporated to dryness under reduced pressure. The crude semi-solid product was recrystalized from hexane. The product M.P. 140° C. was produced in 50% yield.

*Analysis.*—Found: C, 52.1; H, 8.1; N, 33.1%.

$C_{11}H_{20}N_6O$ requires: C, 52.9; H, 8.0; N, 33.3%.

A similar result was obtained in another preparation in which the potassium permanganate was added as an acetone solution.

Compounds produced by the process of the invention and having the above general formula wherein $R^1$ represents a nitroso group can, according to a further extension of this process be oxidized to the corresponding nitro compound. The oxidizing agent used for this purpose is nitrogen dioxide. Anhydrous or substantially anhydrous conditions are required for this oxidation reaction. The reaction is effected in an inert liquid reaction medium which may be a petroleum ether, a hydrocarbon, or a similar solvent. Hexane has proved a most suitable inert reaction medium. The organic liquid is anhydrous or substantially anhydrous. According to its solubility the nitroso compound may be suspended or dissolved in the liquid, and gaseous nitrogen dioxide passed into the resulting suspension or solution. During the passage of nitrogen dioxide, the suspension or solution may be kept at a temperature in the range 15° C. to the reflux temperature of the reaction mixture, for example 100° C. Nitrogen dioxide may be prepared by any suitable means. The nitrogen dioxide is dry or substantially dry. An inert gaseous carrier for the nitrogen dioxide may also be used. A suitable gaseous carrier is air, oxygen, nitrogen, or argon. The resulting product may be filtered off and washed with the inert reaction medium and finally with dry ether if desired. If the resulting product is an oil, it may be further purified by any method known in the art. A suitable method of purification is by a chromatographic means for example, using a silica gel column.

The following examples illustrate the preparation of the nitro-triazine compounds from the corresponding nitroso derivatives.

*Example VII.—Preparation of 2,4-bisethylamino-6-nitro-1,3,5-triazine*

2,4-bisethylamino-6-nitroso-1,3,5-triazine (4 grams) as prepared in Example V was suspended in dry hexane (50 milliliters) and excess nitrogen dioxide with dry air as carrier gas was passed into the suspension. The nitrogen dioxide was prepared by the thermal decomposition of lead nitrate (10 grams). During the passage of nitrogen dioxide, the suspension was vigorously stirred and maintained at room temperature for a period of 4 hours. The resulting product was filtered off, washed firstly with hexane and then dry ether. A nearly quantitative yield in the form of yellow crystals was obtained. The product melted at 170° C. accompanied by slow decomposition.

*Analysis.*—Found: C, 39.4; H, 5.9; N, 39.4%. $C_7H_{12}N_6O_2$ requires: C, 39.6; H, 5.7; N, 39.6%.

*Example VIII.—Preparation of 2,4-bisdiethylamino-6-nitro-1,3,5-triazine*

2,4-bisdiethylamino-6-nitroso-1,3,5-triazine (5 grams) as prepared in Example VI was dissolved in boiling dry hexane (100 milliliters). Nitrogen dioxide together with dry air as a carrier gas was passed into the boiling hexane solution for about four hours. A yellow oil resulted and was purified to a yellow solid M.P. 38° C. using a silica gel column. Yield 95%.

*Analysis.*—Found: C, 49.5; H, 7.5%. $C_{11}H_{20}N_6O_2$ requires: C, 49.3; H, 7.5%.

We claim as our invention:

1. A 1,3,5-triazine compound of the formula

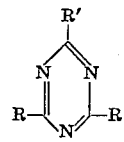

wherein each R represents the group $—N(H)_p(R^2)_q$, $R^2$ representing an alkyl group containing one to three carbon atoms, $p$ being a whole number from 0 to 1 and $q$ an integer from 1 to 2 and such that $p+q=2$, R' represents a member selected from the group consisting of nitro and nitroso.

2. The compound of claim 1 wherein R' is nitro.
3. The compound of claim 1 wherein R' is nitroso.
4. 2,4-bisethylamino-6-nitroso-1,3,5-triazine.
5. 2,4-bisdiethylamino-6-nitroso-1,3,5-triazine.
6. 2,4-bisethylamino-6-nitro-1,3,5-triazine.
7. 2,4-bisdiethylamino-6-nitro-1,3,5-triazine.

References Cited

FOREIGN PATENTS 819,520  9/1959  Great Britain.
618,563  12/1962  Belgium.

OTHER REFERENCES

Royals, "Advanced Organic Chemistry," Prentice-Hall, Inc., 1954, p. 620.

Degering, "An Outline of Organic Nitrogen Compounds," Univ. Lithoprinters, 1950, pp. 125, 126, 154, 155 and 158.

Theilheimer, "Synthetic Methods of Organic Chemistry," vol. 14, Interscience Pub. Inc., 1960, p. 239.

Grundmann et al., "Chemische Berichte," vol. 87 (1954), pp. 747–754.

Rodd, "Chemistry of Carbon Compounds," vol. III, A. Elsevier Pub. Co. (1954), pp. 148, 149.

Gysin, "Chemistry and Industry (London)," Aug. 4, 1962, pp. 1393–1400.

NORMA S. MILESTONE, *Acting Primary Examiner.*

JOHN D. RANDOLPH, NICHOLAS S. RIZZO,
*Examiners.*

J. M. FORD, M. W. WESTERN, *Assistant Examiners.*